(12) United States Patent
Lane-Lohse

(10) Patent No.: US 11,400,865 B2
(45) Date of Patent: Aug. 2, 2022

(54) SECURITY MOUNTING BRACKET DEVICE FOR A CROSSBAR

(71) Applicant: Ian William Lane-Lohse, Julian, CA (US)

(72) Inventor: Ian William Lane-Lohse, Julian, CA (US)

( * ) Notice: Subject to any disclaimer, the term of this patent is extended or adjusted under 35 U.S.C. 154(b) by 0 days.

(21) Appl. No.: 17/344,823

(22) Filed: Jun. 10, 2021

(65) Prior Publication Data

US 2021/0300258 A1 Sep. 30, 2021

Related U.S. Application Data

(63) Continuation-in-part of application No. 16/857,160, filed on Apr. 23, 2020.
(Continued)

(51) Int. Cl.
*B60R 11/00* (2006.01)
*B60R 9/10* (2006.01)
(Continued)

(52) U.S. Cl.
CPC .................. *B60R 9/10* (2013.01); *B60P 3/36* (2013.01); *B60R 9/048* (2013.01); *B60R 9/058* (2013.01);
(Continued)

(58) Field of Classification Search
CPC ..... B60R 2011/0052; B60R 2011/0096; B60R 9/048; B60R 9/058; E04H 15/06; B25B 13/485; F16B 41/005
(Continued)

(56) References Cited

U.S. PATENT DOCUMENTS 2,784,888 A * 3/1957 Lecanu-Deschamps ................... B60R 9/058
224/325
3,241,797 A * 3/1966 Anderson ................. F16L 3/04
248/71

(Continued)

OTHER PUBLICATIONS

Image from Wheel Every Weekend YouTube video demo of the security mounting bracket device: https://www.youtube.com/watch?v=KOCSagkQkHs, Oct. 28, 2019.
(Continued)

*Primary Examiner* — Bradley Duckworth
(74) *Attorney, Agent, or Firm* — Potuznik IP; Suzan Potuznik

(57) ABSTRACT

Provided herein is a security mounting bracket device that can be used to securely connect a crossbar to a mounted object. The device is shaped to form a contoured fit with the crossbar and adapted for use with a security nut and bolt rendering both nut and bolt unexposed outside of the device and inaccessible to tools that may be used to forcibly remove the mounted object. The security mounting bracket device can be used as an antitheft device as a security socket is required to remove the nut form the security mounting bracket. The contoured fit reduces the movement of the crossbar within the security mounting bracket device therefore reducing vibrationally induced failure of the mount and loss of mounted object. The security mounting bracket device smooth edges and unexposed nut and bolt also make it a safer bracket for the user in assembly. The size and contour of the security mounting bracket device can be customized to connect any shape of a crossbar to a mounted object such as a guide rail attached to a platform or to a platform directly. The crossbar can be mounted perpendicularly or at other angles, to the security mounting bracket
(Continued)

device or and can be used to connect a plurality of mounted objects for example platforms for tents or cargo containers.

20 Claims, 11 Drawing Sheets

Related U.S. Application Data

(60) Provisional application No. 62/837,692, filed on Apr. 23, 2019.

(51) Int. Cl.
  *B60P 3/36* (2006.01)
  *B60R 9/048* (2006.01)
  *B60R 9/058* (2006.01)
  *F16B 41/00* (2006.01)
  *E04H 15/06* (2006.01)

(52) U.S. Cl.
  CPC ....... *F16B 41/005* (2013.01); *B60R 2011/004* (2013.01); *B60R 2011/0052* (2013.01); *B60R 2011/0096* (2013.01); *E04H 15/06* (2013.01)

(58) Field of Classification Search
  USPC .................................. 411/910; 248/67.7, 71
  See application file for complete search history.

(56) References Cited

U.S. PATENT DOCUMENTS

| | | | | |
|---|---|---|---|---|
| 4,081,118 A | * | 3/1978 | Mason | B60P 3/1008 224/324 |
| 4,487,349 A | * | 12/1984 | Kudo | B60R 9/12 224/322 |
| 5,181,639 A | * | 1/1993 | Kvanna | B60R 9/055 224/319 |
| 5,314,104 A | * | 5/1994 | Lee | B60R 9/045 224/309 |
| 6,193,252 B1 | * | 2/2001 | Lin | B62B 7/12 280/204 |
| 6,425,509 B1 | * | 7/2002 | Dean | B60R 9/048 211/20 |
| 6,789,712 B2 | * | 9/2004 | Gates | B60R 9/048 211/64 |
| 6,959,627 B2 | * | 11/2005 | Doran | B25B 13/06 411/402 |
| 7,877,922 B1 | * | 2/2011 | Petrie | B60R 9/055 43/26 |
| 8,136,709 B2 | * | 3/2012 | Jeli | B60R 9/12 224/323 |
| 9,896,034 B2 | * | 2/2018 | Ward | B60R 9/04 |
| 10,543,771 B2 | | 1/2020 | Sautter et al. | |
| 10,556,546 B2 | * | 2/2020 | Burton | B60R 9/058 |
| 2002/0125282 A1 | | 9/2002 | Laverack | B60R 9/045 224/319 |
| 2006/0273122 A1 | * | 12/2006 | Bogoslofski | B60R 9/08 224/324 |
| 2006/0289577 A1 | * | 12/2006 | Malone | B60R 9/058 224/323 |
| 2008/0029563 A1 | * | 2/2008 | Malone | B60R 9/00 224/319 |
| 2021/0062835 A1 | * | 3/2021 | Saeter | F16B 2/065 |

OTHER PUBLICATIONS

Image of archived www.wheeleveryweekend.com website 1st release of the RTT Security Mount: https://web.archive.org/web/20180815195413/https://www.wheeleveryweekend.com/, Aug. 4, 2018.

\* cited by examiner

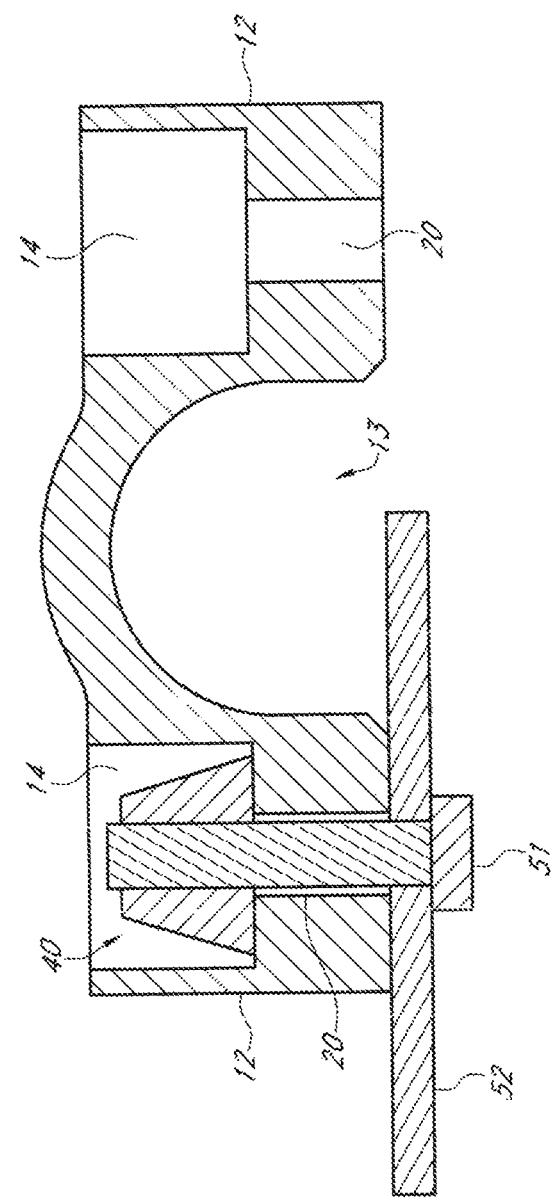

SECURITY MOUNTING BRACKET DEVICE FOR A CROSSBAR

CROSS-REFERENCE TO RELATED APPLICATIONS

This application is a continuation-in-part of U.S. patent application Ser. No. 16/857,160 filed Apr. 23, 2020 and claims benefit of priority to U.S. Provisional Application No. 62/837,692, filed Apr. 23, 2019, entitled "Rooftop Tent Crossbar Anti-Theft Mount". The subject matter of the above noted applications is incorporated by reference in its entirety.

FIELD OF THE INVENTION

Provided herein is a security mounting bracket device that can be used to connect a cross bar to an object to be mounted for example as a cartop tent, a cargo box or a bike rack.

BACKGROUND

Camping outdoors is a worldwide hobby and a car rooftop tent offers unique advantages that include easy set-up, safer off the ground location and the flexibility to set up camp anywhere a vehicle can reach. Plans on how to make a car rooftop tent can be found on the web and many top brand camping gear manufacturers provide car roof top tent in their product lines. The hardware used to attach the tent to a car roof rack is not included or may focus primarily on ease of attachment. The hardware may be a simple plate, nut, and bolt system or a specialized bracket which is typically easy to remove or leaving a section of a bolt exposed and easily accessible. A bolt cutter can snap the connections in minutes and the tent becomes an easy target for theft. The various mounting hardware also may fail when a car goes off road and the mounted cargo start to angulate.

Thus there is a need for a crossbar mount for vehicle rooftop tents, and other systems to be mounted, that is durable and easy to use, conforms to the shape of various platforms and racks, without compromising the integrity of the mounting bracket device and that protects the mounted system such as a rooftop tent from theft and from vibrating off the mounted structure.

REFERENCE NUMERALS LIST

The following list indicates the terms used and the corresponding reference numerals. Reference to each should be made with respect to the description below and the accompanying Drawings.

10 security mounting bracket device
12 security mounting bracket device mounting post
12' central security mounting bracket device mounting post
13 bridge of the security mount
14 counterbore hole well
20 counterbore hole bolt entry end
3h height of mounting post
3w width of security mounting bracket device
3r height of security mounting bracket device
3s length of security mounting bracket device
3t width of tunnel
3x distance between borehole centers
3y diameter of counterbore hole bolt entry end
3z diameter of counterbore hole well
3q height of tunnel
3u depth of counterbore hole bolt entry end
3v width of tunnel
40 security nut
41 threaded bore hole of security nut
42 groove of security nut
51 bolt
52 mounting channel slide
60 mounting rail
61 channel of mounting rail
70 crossbar
80 security mounting bracket device with a wide contoured fit bridge
81 bridge of security mounting bracket device 80
82 mounting post of security mounting bracket device 80
85 security mounting bracket device with rectangular shaped contoured fit bridge
86 bridge of security mounting bracket device 80
87 mounting post of security mounting bracket device 80
90 security mounting bracket device with a wide contoured fit bridge
91 bridge of security mounting bracket device 90
92 mounting post of security mounting bracket device 90
93 flat grooved crossbar
100 security mounting bracket device for a two crossbar attachment
101 bridge of a security mounting bracket device 100

SUMMARY

Provided herein is a security mounting bracket device for mounting an object to a crossbar. The security mounting bracket device is a single piece of molded material that includes: one or more bridge portions, with each bridge portion positioned between two mounting posts, each mounting post having a top portion and a bottom portion; a counterbore hole preferably centered within each mounting post, spanning the height of each post, wherein a first portion comprises a counterbore hole well positioned in the top portion of the mounting post connected to the bridge portion and is dimensioned for placement of a nut within the counterbore hole well preferably below the surface of the post, and the second portion comprises a narrower counterbore hole bolt entry end positioned in the bottom portion of the mounting post; and wherein the bridge and two mounting posts form a contoured tunnel matching the contour and dimensions of a crossbar. The security mounting bracket device is molded from material that will not be altered by ambient heat and pressure exerted by the cross bar and mounted object. Exemplary materials include: hard metal, metal alloy, composite material, polymers including material selected from among aluminum, steel, titanium, zinc alloys and hard plastic. Materials that include metal may be anodized to further reduce corrosion and wear.

Provided herein is a security mounting bracket device wherein the width of the security mounting bracket device as measured from the outer portion of the mounting posts, see e.g. 3w of FIG. 3B, is from or from about 1.0 inch to 10.0 inches or 1.0 inch to 24.0 inches or 1.0 foot to 5.0 feet and is determined by the width or diameter of the crossbar. The counterbore hole well has a depth between 0.1 inches and 1.0 inch, or 0.3 inches and 0.9 inches, or 0.4 and 0.8 inch or 1.0 inch to 2 inches or 2.0 inch to 12.0 inches, 12.0 inches to 24.0 inches and the counterbore hole entry end diameter is about 0.1 inches to 1.0 inch, 1.0 inch to 12.0 inches, 12.0 inches to 24.0 inches. The height of the security mounting bracket device mounting post is determined by the size of the crossbar and is from or from about 0.2 inches to 2.0 inches, or 2.0 inches to 12.0 inches, or 1.0 foot to 5.0 feet.

In yet another embodiment the security mounting bracket device includes: two bridge portions with three post portions with the two bridges connected to a shared central post that optionally includes a counterbore hole; and wherein the walls of the contoured tunnel formed by the bridge and mounting posts that are perpendicular to the alignment of the posts of the security mounting bracket. Optionally the walls of the contoured tunnel formed by the bridge and mounting posts are parallel and not perpendicular to the alignment of the posts of the security mounting bracket wherein the walls of the contoured tunnel formed by the bridge and form an angle that is less than 90° with the alignment of the posts of the security mounting bracket.

A method of using the security mounting bracket device described above includes a method of forming a bolted joint between a mounting channel slide of a mounted object and the security mounting bracket device that includes the steps of: a) placing a bolt through a hole of mounting channel slide and inserting the mounting channel slide into the channel of the mounting rail wherein the head of the bolt is positioned between the mounting channel slide and the mounting rail leaving the unthreaded and threaded shank of the bolt exposed beneath the mounting channel slide; b) repeating step a) with a second bolt and a second mounting channel slide, aligning the two bolts suspended from the mounting rail a distance equal to the distance between two counterbore bolt entry holes of a security mounting bracket device; c) inserting the two bolts through the aligned counterbore hole bolt entry ends of the two posts of the security mounting bracket device and positioning the threaded shank of the bolt within the well of the counterbore hole; and d) placing a nut onto the threader shank of the bolt within the counterbore hole well and tightening the nut onto the bolt using a socket, forming a bolted joint between the security mounting bracket device and the mounting channel slide within the mounting rail.

In yet further embodiments a method of mounting an object, fitted with a mounting rail to a crossbar using the security mounting bracket device includes the steps of: a) placing a bolt through a hole of mounting channel slide and inserting the mounting channel slide into the channel of the mounting rail wherein the head of the bolt is positioned between the mounting channel slide and the mounting rail leaving the unthreaded and threaded shank exposed beneath the mounting channel slide; b) repeating step a) with a second bolt and aligning the two bolts suspended from the mounting rail a distance equal to the distance between two counterbore bolt entry holes of a security mounting bracket device; c) placing the object with mounting rail on top of the crossbar; d) straddling a crossbar, perpendicular to and below the mounting channel rail, with the security mounting bracket device, inserting the two bolts through the two post of the security mounting bracket device positioning the threaded shank of the bolt within the well of the counterbore hole; and e) using a nut and socket, placing the nut onto the threader shank of the bolt and tightening the nut onto the bolt and forming bolted joints between the security mounting bracket device and the mounting channel slide within the mounting rail. Optionally repeating steps a)-b) with one or more pairs of bolts followed by steps c)-e) placing wherein a bolted joint is formed between each of the one or more security mounting bracket devices and mounting channel slides within the mounting rail. Further the nut is optionally selected from among security nut and a nylon-insert lock nut.

In yet another embodiment a method of mounting an object fitted with two mounting rails to two crossbars using two or more security mounting bracket devices includes the steps of: a) placing a bolt through a hole of mounting channel slide and inserting the mounting channel slide into the channel of a first mounting rail wherein the head of the bolt is positioned between the mounting channel slide and the first mounting rail leaving the unthreaded and threaded shank exposed beneath the mounting channel slide; b) repeating step a) with a second bolt and aligning the two bolts suspended from the mounting rail a distance equal to the distance between two counterbore bolt entry holes of a security mounting bracket device; c) repeating steps a) and b) on the second rail; d) placing the object with mounting rails on top of the crossbar; e) straddling two crossbars, perpendicular to and below the first and second mounting rail, with the security mounting bracket devices, f) inserting the two bolts connected to the channel slide on the first mounting rail through the two posts of the security mounting bracket device positioning the threaded shank of the bolt within the well of the counterbore hole; and using a nut and socket; g) placing the nut onto the threader shank of the bolt and tightening the nut onto the bolt and forming a bolted joint between the security mounting bracket device and the first mounting channel slide within the mounting rail; repeating Steps f)-g) with the second mounting rail and a second security mounting bracket device, wherein a bolted joint is formed between each of two security mounting bracket devices and mounting channel slide within the mounting rail. Optionally repeating steps a)-g) with a one or more sets of security mounting bracket devices wherein a bolted join is formed between each of the security mounting bracket devices and two mounting channel slides within the mounting rail. Further, the nut is optionally selected from among security nuts that require a specialized tool to secure and loosen the nut, or a nylon-insert lock nut and wherein the mounted object is selected for example from among vehicle top tent, a bike rack, and a cargo box.

BRIEF DESCRIPTION OF THE DRAWINGS

The drawings described herein are for illustrative purposes only, represent selected embodiments and not all possible implementations, and are not intended to limit the scope of the present disclosure.

FIG. 5 is a frontal cross sectional view of a rounded bridge security mounting bracket, with a mounting channel slide connected to one mounting post fitted with a bolt and secured in place with a security nut.

Figure 1:
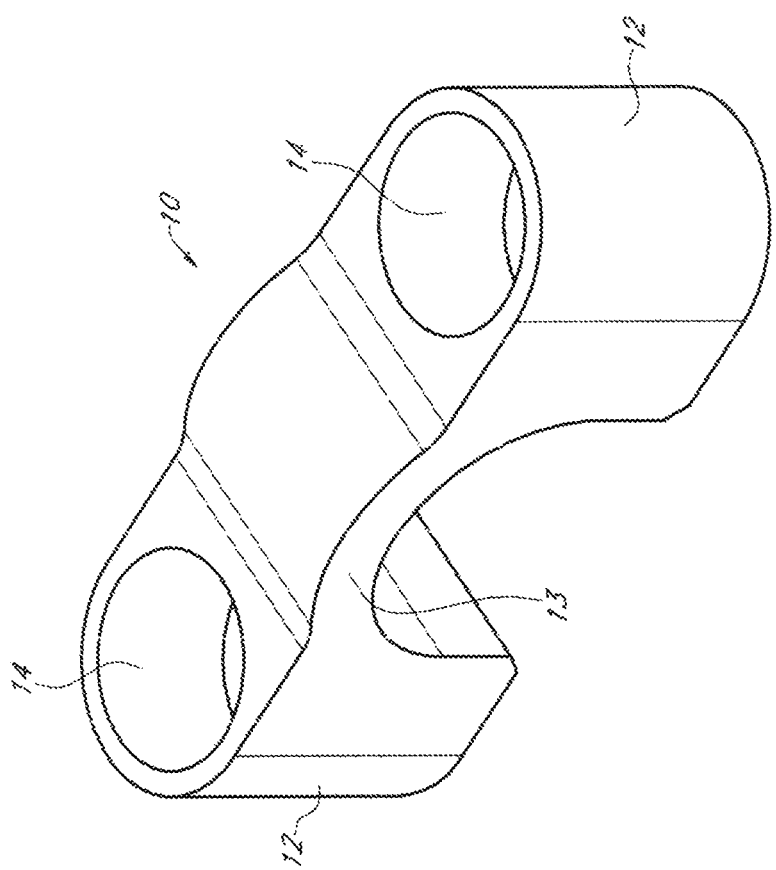
FIG. 1 is a perspective top view of security mounting bracket device with rounded bridge.

Corresponding reference numerals indicate corresponding parts throughout the several views of the drawings. For parts which are similar but not the same as parts originally specified with a given number, a prime (' of the original numbers is used. A lowercase reference numeral (e.g. a, b, etc.) refers to the various portions of a device with assigned dimensions.

DETAILED DESCRIPTION

Definitions

Unless defined otherwise, all technical and scientific terms used herein have the same meaning as is commonly understood by one of skill in the art to which the invention(s) belong. All patents, patent applications, published applications and publications, databases, websites and other published materials referred to throughout the entire disclosure herein, unless noted otherwise, are incorporated by reference in their entirety. In the event that there are a plurality of definitions for terms herein, those in this section prevail. Where reference is made to a URL or other such identifier or address, it understood that such identifiers can change and particular information on the internet can come and go, but equivalent information can be found by searching the internet. Reference thereto evidences the availability and public dissemination of such information.

As used herein, "security mounting bracket" refers to a bracket that connects a crossbar to a mounted object and includes at least two counterbore holes for the placement of a bolt and a security nut, wherein a bolt can pass through the length of the mounting post of the security mounting bracket device and a security nut can fit within the counterbore hole well, preferably below the surface of the security mounting bracket. As described elsewhere herein the security mounting bracket device is customized to the shape of the crossbar.

As used herein, "bridge" refers to a part of the security mounting bracket device that joins two mounting posts of the security mounting bracket"

As used herein, "mounting post" refers to a part of the security mounting bracket device that contains a counterbore hole and two of the mounting posts with the bridge portion form the contoured shape of the security mounting bracket device that straddles the crossbar.

As used herein, "tunnel" refers to the contoured opening fitted to a cross bar and formed by a bridge and two mounting posts of the security mounting bracket device.

As used herein, "counterbore hole", refers to a hole in the device that includes a wide counterbore hole well and a narrow counterbore hole bolt entry end wherein a cylindrical flat-bottomed hole, the well, enlarges another coaxial hole, the bolt entry end, and functions to secure a bolt with a nut. The larger diameter hole, the counterbore hole well, is wide enough and deep enough to completely, or almost completely enclose a nut and the counterbore hole well and the narrower coaxial hole span the entire height of the security mounting bracket device mounting post.

As used herein, "contoured" refers to the shape of a tunnel portion of a security mounting bracket device designed to form a close fit between the security mounting bracket device and a crossbar. The contoured shape of the security mounting bracket device is formed by the bridge and two mounting posts of the security mounting bracket, and is matched to the shape of the crossbar straddled by the security mounting bracket.

As used herein, "security nut" refers to an externally grooved or pitted nut that requires the use of a matching security socket to unscrew/screw the nut onto a bolt. The shape of the nut can include a conical shape or a cylindrical shape. A security nut can be obtained for example from Loss Prevention Fasteners of Canada at www.losspreventionfasteners.com.

As used herein, "security socket" refers to a socket that is a complementary match to the security nut and is required to fit within the counterbore hole to unscrew/screw the nut from/to a bolt.

As used herein, "nylon-insert lock nut" also referred to as a nyloc nut, polymer-insert lock nut, or elastic stop nut, is a nut with a nylon insert that keeps metric bolt threads from coming loose due to vibration, wear, and temperature. A nylon-insert lock nut may be obtained from e.g. www.mcmaster.com/nylock-nuts.

As used herein, "crossbar" refers to bar that is mounted, or straddled, by the security mounting bracket device and can take on various shapes and sizes as described further below.

As used herein, "mounting channel rail" refers to a slide rail assembly with channel formed within a strip that serves as a guide for a mounting channel slide wherein the overhang of the two opposing walls of the mounting rail grip and hold a mounting channel slide. The mounting rail is made of strong material such as aluminum, stainless steel, titanium, zinc alloys or hard plastic.

As used herein, "mounting channel slide" refers to a strip that fits and slide within the channel of the mounting channel rail.

As used herein, "mounted object" refers to any object that is connected to a crossbar by the security mounting bracket.

As used herein, "primary mounted object" refers to any object that is directly connected to the security mounting bracket device by a bolted joint such as a mounting channel slide.

As used herein, "bolted joint" refers to joint formed using a bolt and a nut to connect two objects by tightening a nut onto the threaded portion of the bolt passing though the two objects, pressing the two object together.

As used herein, "secondary mounted object" refers to any object that is connected to a crossbar by the security mounting bracket device through a primary mounted object. A secondary mounted object can include a tent, luggage rack, a bike rack, a storage tub.

As used herein, "plate" refers to a portion of a primary mounted object that is a flat structure made of a hard material and is fitted with a hole whose diameter is larger than the diameter of the bolt shaft and smaller than the diameter of the bolt head. The plate can form a bolted joint with the security mounting bracket device directly and can be the base or platform of a secondary mounted object.

As used herein, "platform" refers to the base of a secondary mounted object which may be adapted with a mounting rail(s) or function as the primary mounted object as described below.

The Security Mounting Bracket Device

Provided herein is a security mounting bracket device that can be used to reversibly secure a crossbar to a mounted object. The mounted object can be for example a rod, a bar, a metal plate or a platform that may or may not include a mounting channel rail. The security mounting bracket device has a custom contoured tunnel formed by the bridge and the mounting posts that can straddle a bar of a selected shape, for example the shape can include a pipe or rod that is round, rectangular, square, elliptical or the bar can be textured with grooves, channels or ridges. The bridge and mounting posts of the device form a tunnel shaped to straddle a cross bar. The tunnel walls are preferably perpendicular to the mounting bracket device bridge forming an angel between the tunnel walls and bridge that is 90°. In further embodiments the tunnel walls are not perpendicular to the bridge forming an angel other than a 90° between the tunnel walls and bridge. As the tunnel portion of the security mounting bracket device is molded out of one piece of material and can vary in length, the angle of the tunnel walls with respect to the line of security mounting bracket device formed between the centers of the two mounting posts can vary for example from 90° to 45° making the angle between the straddled crossbar and the security mounting bracket device customizable. Non-perpendicular crossbar and mounting rail can therefore also be connected by a bolted joint with a security mounting bracket device that is molded with tunnel walls angled to match the angle formed between the crossbar and mounting rail.

The two mounting posts, one on each side of the bridge, include a counterbore hole with a wide well cylindrical hole adjacent to the top of the mounting bracket device and bridge, and a narrower coaxial cylindrical hole at the bottom of the mount. The wider well opening provides a space for a security nut to fit inside the device and to secure a bolt within the bore hole, without leaving the security nut exposed outside of the device. A matching security socket is required to reach the nut and to screw and unscrew a bolt that passes through the bore hole of the device. The narrower cylindrical hole of the counterbore at the bottom of the mounting bracket device serves as the entry point of the bolt that passes through a hole of a primary mounted object, prior to entering the bore hole of the device. The head of the bolt, secured by the device and the security nut, holds the primary mounted object, for example a second bar, a channel guide, a sheet, a plate, or platform, to the crossbar straddled by the bridge and the mounting posts of the device. A secondary mounted object can be attached to the primary mounted object and can include for example a tent, a container, or a bike rack. The secondary object can be fitted with a means of attachment to the primary mounted object, for example a channel guide to secure the object to a bolt connected to a channel slide. In certain embodiments the object to be mounted includes holes for placement of the screws, aligned with the dimensions of the security mounting bracket device, that can form a bolted joint with the security mounting bracket device, straddling a crossbar, and a primary mounted object such as the mounting rail is not necessary.

Optionally the security nut can be replaced with a nylon-insert lock nut or other nut that will form a tight grip with the bolt.

The device is made of a strong hard material that will not be altered by ambient heat and pressure exerted by the cross bar and mounted object and can include material such as aluminum, steel or stainless steel, titanium, zinc alloys or hard plastics. In one embodiment the material is aluminum metal selected for its strength, durability, and light weight. Materials that include metal may be anodized to further reduce corrosion and wear. The choice of the material used are within the level of a skilled artisan.

The device, including exemplary embodiments of the device, will be described with reference to the accompanying drawings.

In a general embodiment, the security mounting bracket device provided herein, includes bridge, mounting posts, a contoured tunnel formed by the bridge and mounting posts, and a counterbore hole within each mounting post.

Figure 2:
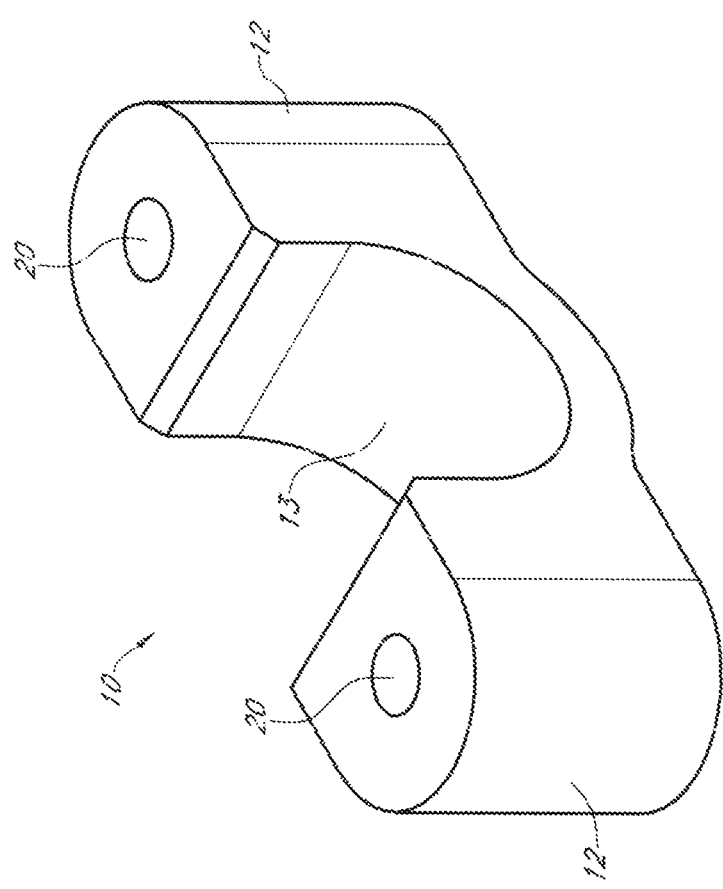
FIG. 2 is a perspective bottom view of security mounting bracket device with rounded bridge.
Figure 3A:
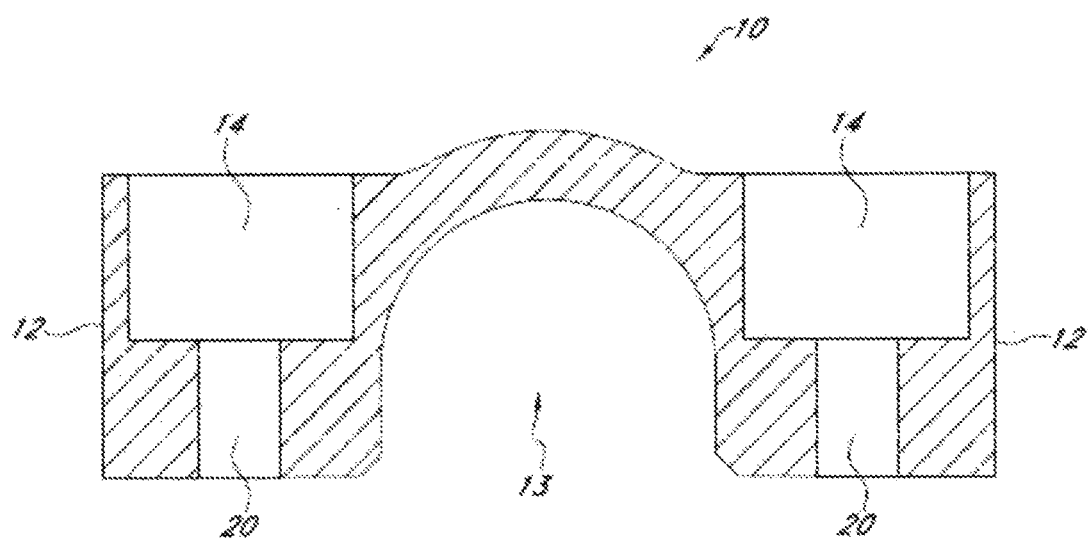
FIG. 3A is a side cross sectional view of security mounting bracket device with rounded bridge.

For example, with reference to FIG. 1. which illustrate a first exemplary embodiments provided herein, the security mounting bracket device is indicated generally by the reference numeral 10, includes security mounting bracket device mounting posts 12, bridge 13, counterbore hole wells 14. The underside of the security mounting bracket device 10 is exemplified in FIG. 2 includes security mounting bracket device mounting posts 12, bridge 13, and counterbore narrower hole 20 that serves as the bolt entry point. FIG. 3A shows a side cross sectional view of security mounting bracket device 10 with rounded bridge 13, counterbore hole wells 14, and counterbore hole bolt entry ends 20.

The security mounting bracket device 10 bridge 13 and mounting posts 12 form a contoured fit with a crossbar minimizing the space between the mount and crossbar and reducing movement of the mounted object attached to the crossbar, for example reducing vibrationally induced failure of the mount and loss of mounted object when the object is in motion. The minimized space between the mount and crossbar reduces the space that could be accessed for example by a bar to pry the mounted object off the security mounting bracket device. In reference to FIGS. 1-3A, the crossbar with a round shape portion can fit in the contoured tunnel formed by bridge 13 and mounting posts 12. The cross sectional view of security mounting bracket device 10 with rounded bridge, exemplified in FIG. 3A, provides a view of the counterbore wells 14, that reach into the mounting posts 12 and provide an opening for the placement of a security nut. The counter bore spans the entire height of the mounting posts 12 of the mounting bracket device to allow a bolt to pass through the mounting bracket device and form a bolted joint connecting with the mounted object to a crossbar.

The wider cylindrical well of the counterbore provides a space for a security nut to fit inside the device and secure a bolt within the bore hole, without leaving the security nut exposed outside of the device. A matching security socket is required to reach the nut and to screw and unscrew a bolt that passes through the bore hole of the device. The narrower opening at the bottom of the mounting bracket device serves as the entry point of the bolt that passes through a hole of a primary mounted object, prior to entering the bore hole of the device.

Figure 3B:
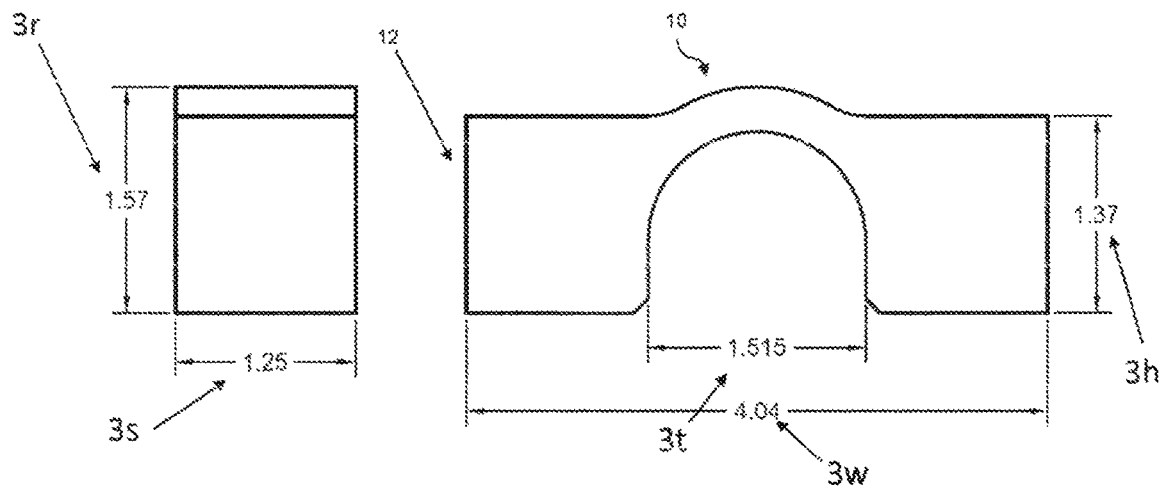
FIG. 3B is a frontal view of security mounting bracket device that includes dimensions of an exemplary device.
Figure 3C:
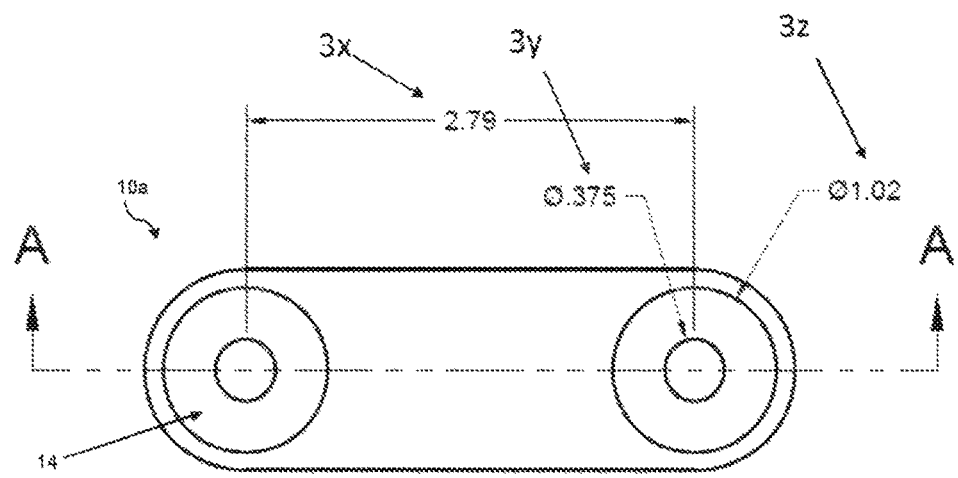
FIG. 3C is a top view of security mounting bracket device with counterbore hole and includes dimensions of an exemplary device.
Figure 3D:
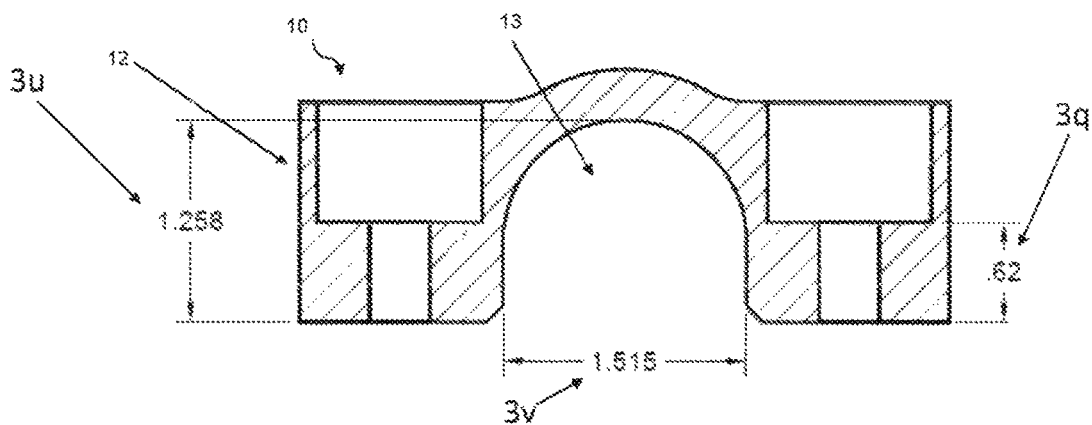
FIG. 3D is a frontal view of security mounting bracket device with counterbore hole and includes dimensions of an exemplary device.

The dimensions of the exemplary security mounting bracket device of FIGS. 1-3A are provided in FIGS. 3B-3D wherein FIG. 3B includes height of post $3h$; width of security mounting bracket device $3w$; height of security mounting bracket device to the top of the bridge, $3r$; length of security mounting bracket device $3s$; Width of tunnel $3t$. FIG. 3C provides distance between borehole centers $3x$; diameter of small borehole $3y$; diameter of large borehole $3z$. FIG. 3D provides height of tunnel $3q$; Depth of small borehole $3u$; width of tunnel $3v$. The dimensions provided in FIGS. 3B-3D are of an exemplary device and are in the units of inches. In further embodiments the numerical values of FIGS. 3B-3D dimensions may be representative of the approximate relative dimensions in various units of length.

Figure 4:
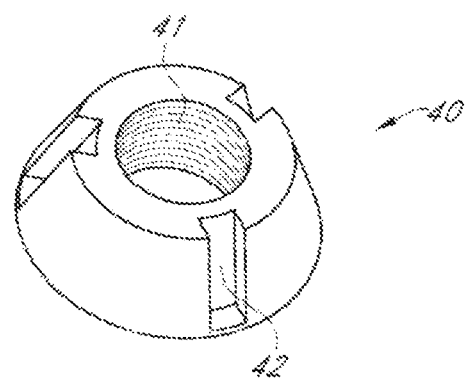
FIG. 4 is a perspective top view of an exemplary security nut for attachment of the security mounting bracket.

FIG. 4 illustrates an exemplary security nut that fits within the counterbore cylindrical wells, 14. The security nut has a grooved and/or ridged surface that requires the use of matching security socket to access the security nut.

FIG. 5 illustrates the use of the security mounting bracket device in securing a mounted object to a cross bar. The frontal cross-sectional view of a rounded bridge 13 and security mounting bracket device 10 illustrates the placement of a bolt 51 within the mount, first passed through the first mounted object, exemplary mounting channel slide 52, and through a counterbore hole to a well 14 where the bolt is secured in place by a security nut 40.

Figure 6:
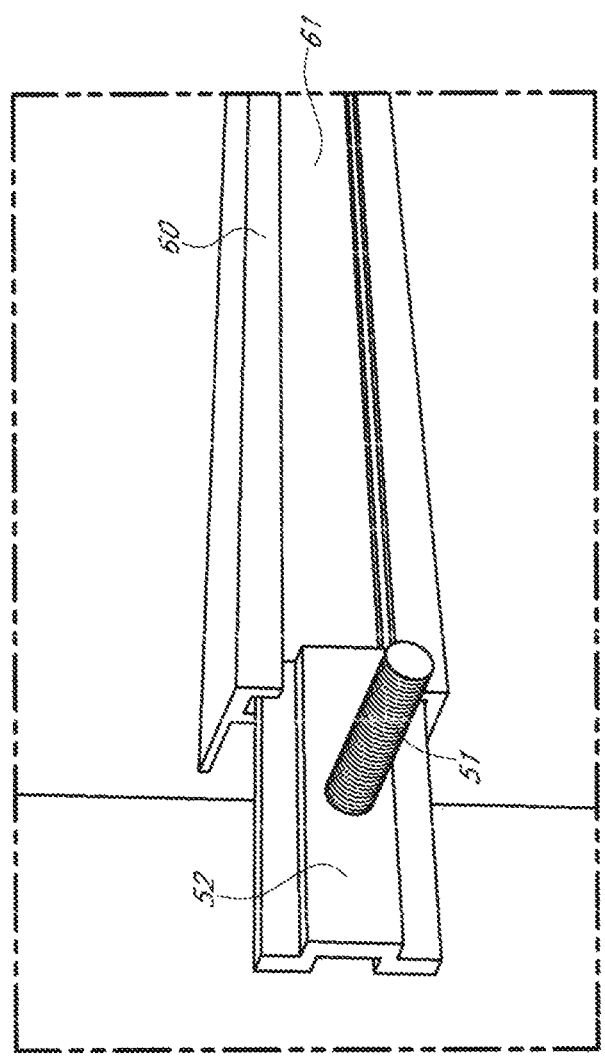
FIG. 6 is a perspective view of a channel slide fitted with a bolt and partially inserted into a channel of a mounting rail.

An exemplary connection between the primary mounted object and the secondary mounted object is provided in FIG. 6 where the first mounted object, a channel slide 52, is inserted in part within a channel 61 of a mounting rail 60. A mounting rail can be secured to the bottom of a platform for various object including vehicle tent. The mounting of mounting channel 61 to a crossbar 71 by the security mounting bracket device 10 is exemplified in FIG. 7 with a round pipe provided as the crossbar 71. The security mounting bracket device 10, bridge 13 and mounting posts 12 contoured to fit the round shape of a crossbar, straddles the crossbar and its base is tightly secured to the mounting channel slide 52 secured within a mounting rail 60. A bolt 51 end is visible within the well 14 and the security nut is deep within the well (not shown) and preferably not exposed above the well. The security mounting bracket device 10, as shown mounted in FIG. 7, cannot easily be removed without the use of a security socket that is a complimentary match to the surface of a security nut. The security nut cannot be cut off as it is deep within the security mounting bracket device 10 well 14 and the tight fit between the security mounting bracket device 10 and slide does not provide room for a typical bolt cutter or saw to reach bolt 51. The security nut is preferably positioned below the surface of the security mounting bracket device. Alternatively, a security nut forming a jointed bolt that is positioned partially above the surface of the security mounting bracket device may also be used and preferably requires the use of a matching security socket to remove the nut and the portion exposed above the surface of the security mounting bracket device should not be removable by cutting means.

Figure 8A:
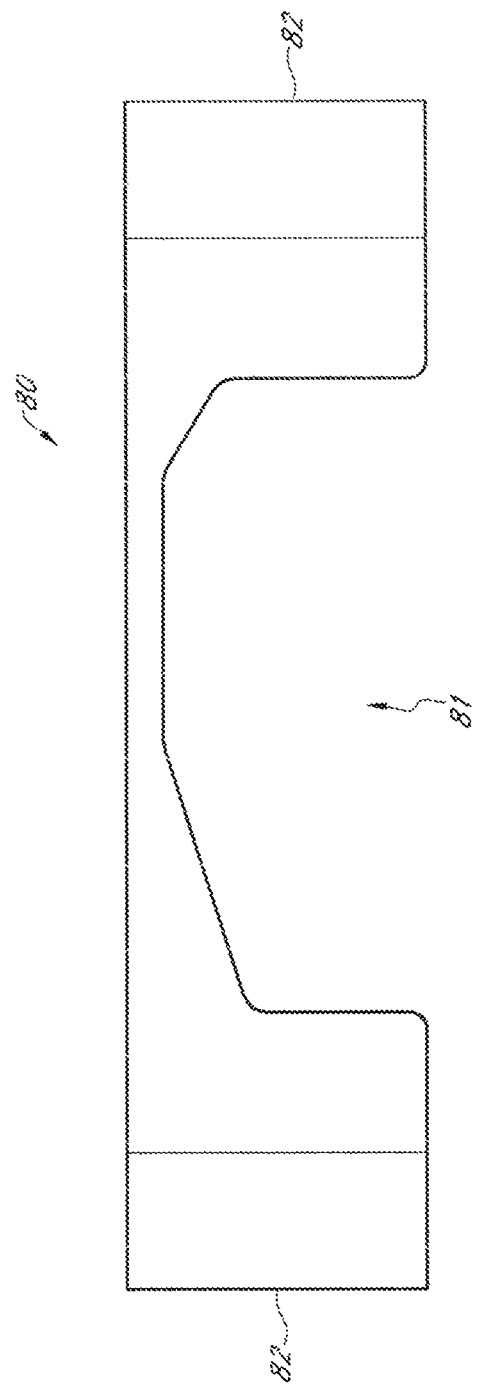
FIGS. 8A-8B are a side view of security mounting bracket device with exemplary variations of the contoured shape of the bridge.
Figure 8B:
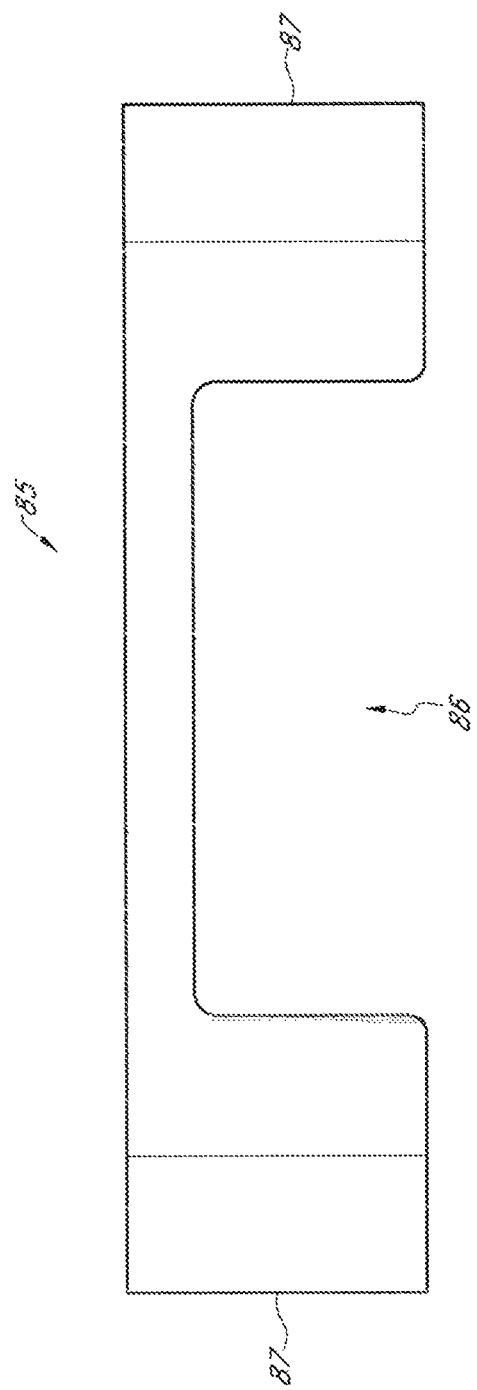
Figure 9:
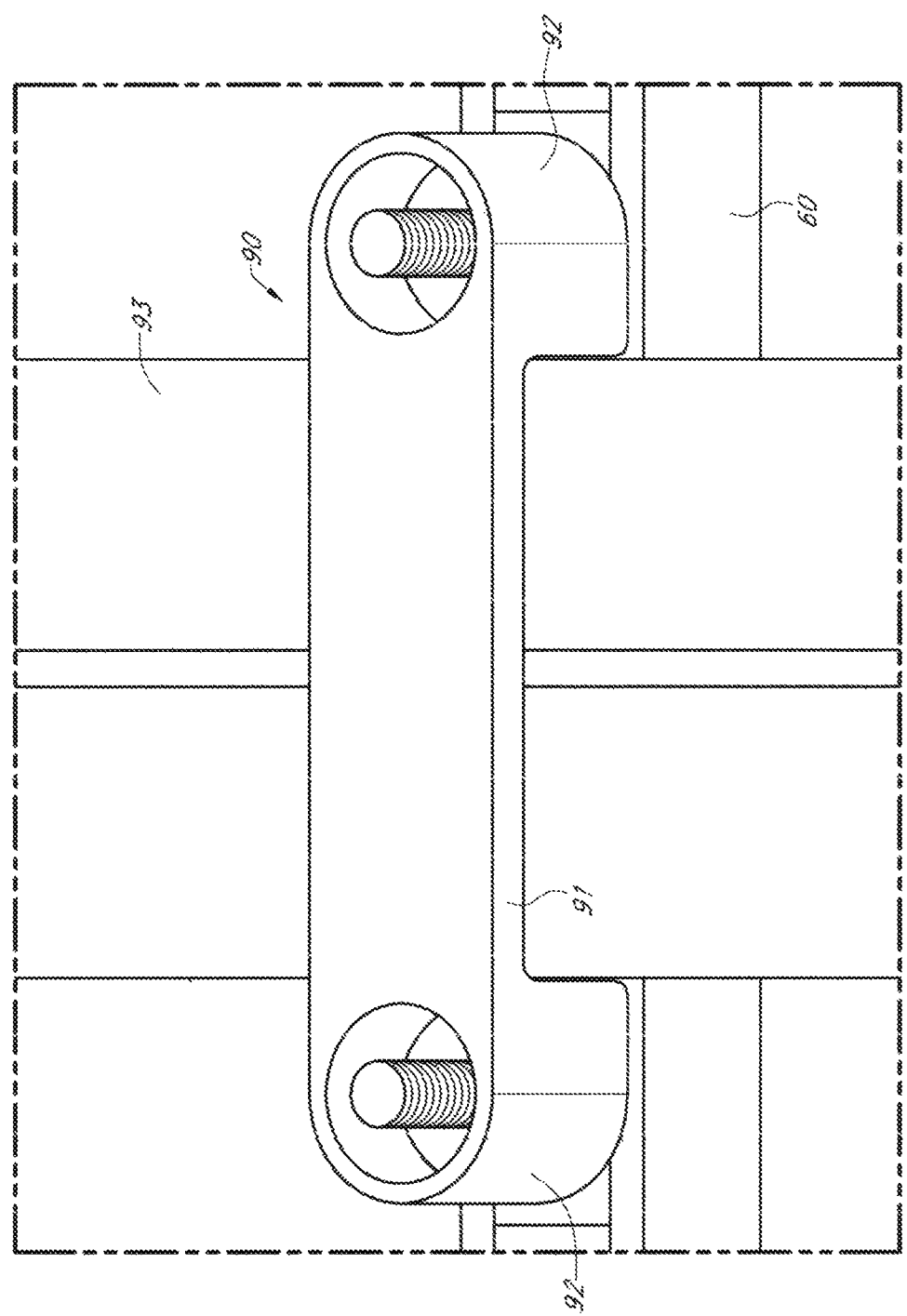
FIG. 9 is a perspective top view of wider security mounting bracket device mounting a flat cross bar to a mounting rail.

In further embodiments of the security mounting bracket device, exemplified in FIGS. 8A, 8B and 9, the shape of a of the security mounting bracket device is customized to fit crossbars of various shapes. The security mounting bracket device 80, as shown in FIG. 8A, is designed to straddle a wide, ridged crossbar as shown in the outline of the bridge 81 and mounting posts 82. The security mounting bracket device 85 and the contour of bridge 86 and mounting posts 87 is designed to straddle a rectangular shaped crossbar (see FIG. 8B). FIG. 9 provides yet another embodiment of a security mounting bracket device 90 with a wide bridge 91 and mounting posts 92 contoured and mounted over a wide crossbar 93 to a rail 60.

Figure 10:
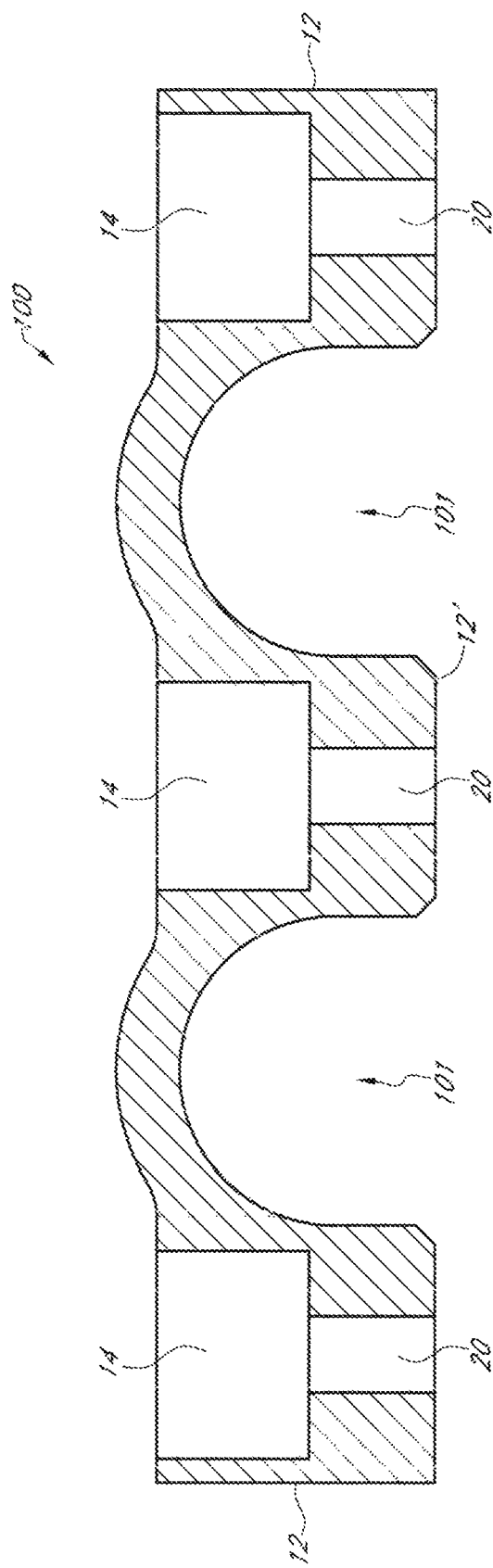
FIG. 10 is a side cross sectional view of security mounting bracket device with two rounded bridge and three mounting posts for a two-crossbar attachment.

In yet another embodiment a security mounting bracket device can connect two or more crossbars to a mounted object. For example, FIG. 10 shows a security mounting bracket device 100 with two bridges and three mounting posts. In this exemplary view the two bridges 101 are designed to secure two round crossbars (not pictured). The two external mounting posts 12 and one internal mounting post 12' are each fitted with a counterbore well 14 and narrow counterbore end 20 for bolt entry. The central mounting post 12' may or may not be secured with a bolt and security nut.

The contoured fit of the security mounting bracket device can be customized to conform to other sizes and shapes of rooftop tent racks, e.g. square, rectangular, or elliptical.

In some embodiments the security mounting bracket device can be about 0.5 inches to 12.0 inches, or 0.75 inches to 10.0 inches, or 1.0 inches to 8.0 inch, or 2.0 inches to 6.0 inches, or 2.5 inches to 5.0 inches wide.

In some embodiments the security mounting bracket device, as measured from bottom of post to the top of the bridge, can be about 0.5 inches to 12.0 inches, or 0.75 inches to 10.0 inches, or 1.0 inches to 8.0 inches, or 2.0 inches to 6.0 inches, or 2.5 inches to 5.0 inches high.

In some embodiments the counterbore well 14 the security mounting bracket device can be about 0.2 inches and 2.0 inches, or 0.5 inches to 12.0 inches, or 0.75 inches to 10.0 inches, or 1.0 inches to 8.0 inches, or 2.0 inches to 6.0 inches, or 2.5 inches to 5.0 inches, or 2.0 inches and 12.0 inches, or 12.0 inches and 24.0 inches in diameter.

Ins some embodiments the counterbore well 14 the security mounting bracket device can be about 0.5 inches to 12.0 inches, or 0.75 inches to 10.0 inches, or 1.0 inches to 8.0 inches, or 2.0 inches to 6.0 inches, or 2.5 inches to 5.0 inches deep.

In some embodiments the counterbore hole of the security mounting bracket device can be about 0.5 inches to 12.0 inch, or 0.75 inches to 10.0 inches, or 1.0 inches to 8.0 inches, or 2.0 inches to 6.0 inches, or 2.5 inches to 5.0 inches long.

The security mounting bracket device is custom designed to match the shape and the size of the tunnel, formed by the bridge and two mounting posts of the security mounting bracket device, to that of the crossbar to which an object is mounted. In further embodiments the size and shape of the tunnel, as well as the size of the counterbore hole and the nut and bolt selected, can vary based on the dimensions the crossbar to be mounted.

Although the invention has been described in detail with reference to certain preferred embodiments, variations and modifications exist within the scope and spirit of one or more independent aspects of the invention as described.

EXAMPLES

Example 1

A Security Mounting Bracket Device for a Round Crossbar

A Security Mounting Bracket Device for a Round Crossbar, 1.5

The security mounting bracket device as exemplified in FIGS. 1-7 includes a bridge 13 and mounting posts 12 fitted with a counterbore well 14 and counterbore hole bolt entry end 20 for the placement of a bolt 51 through the mounting bracket device securing a mounted object around a crossbar 70 to the device. The exemplary device is made of aluminum and is 4.04 inches wide (mounting post outer edge to mounting post outer edge, distance exemplified by 3*w* of FIG. 3B) and 1.57 inches high at height of bridge to base of mount. The mounting posts are 1.25 inches wide and 1.37 inches high. The arch of the bridge opening is 1.515 inches wide and can accommodate a crossbar of about a 1.5 inches. The counterbore hole well 14 is 1.02 inches wide and the narrower counterbore hole bolt entry end 20 is 0.375 inches wide. The distance between the two counterbore holes (center to center) is 2.79 inches. The depth of the narrow bore is 0.62 inches and the height of the tunnel from the base to the top of the arch is 1.258 inches.

The crossbar must easily fit within the contoured tunnel formed by the bridge and mounting posts of the security mounting bracket device yet leave minimal space between crossbar and security mounting bracket device exposed.

The points on the security mounting bracket device used to provide the dimensions of Example 1 are exemplified in FIGS. 3B-3D.

Dimensions of the two additional designs, 1.25" and 1.75, are provided below.

A Security Mounting Bracket Device for a Round Crossbar, 1.25

The "1.25" security mounting bracket device is 3.65 inches wide and 1.33 inches high at height of bridge to base of mount (distance exemplified by 3r of FIG. 3B). The mounting posts are 1.25 inches wide and 1.19 inches high. The arch of the bridge opening, the tunnel, is 1.14 inches wide and can accommodate a crossbar of about a 1.12 inches. The counterbore hole well 14 is 1.02 inches wide and the narrower counterbore hole bolt entry end 20 is 0.38 inches wide. The distance between the two counterbore holes (center to center) is 2.4 inches. The depth of the narrow bore is 0.44 inches and the height of the tunnel from the base to the top of the arch is 1.01 inches.

A Security Mounting Bracket Device for a Round Crossbar, 1.75

The "1.75" security mounting bracket device is 4.29 inches wide (mounting post to mounting post) and 1.82 inches high at height of bridge to base of mount. The mounting posts are 1.25 inches wide and 1.49 inches high. The arch of the bridge opening is 1.77 inches wide and can accommodate a crossbar of about a 1.75 inches. The counterbore hole well 14 is 1.02 inches wide and the narrower counterbore hole bolt entry end 20 is 0.38 inches wide. The distance between the two counterbore holes (center to center) is 3.04 inches. The depth of the narrow bore is 0.74 inches and the height of the tunnel from the base to the top of the arch is 1.51 inches.

Example 2

Placement of a vehicle top tent on a vehicle roof rack using the security mounting bracket.

Figure 7:
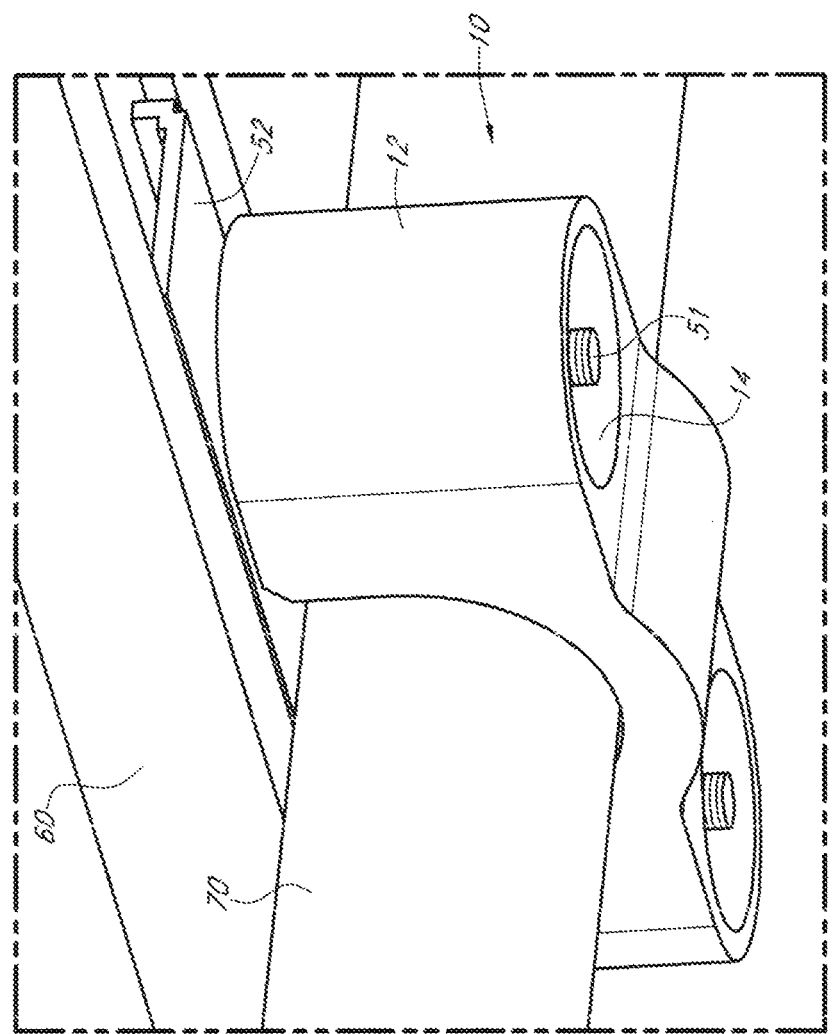
FIG. 7 is a perspective top view of security mounting bracket device with rounded bridge and a round crossbar mounted to a mounting channel by the security mounting bracket device.

An operator places a rooftop tent fitted with two mounting rails on top of two crossbars, crossbar 70 exemplified FIG. 7, so that the mounting channel 61 is perpendicular to the crossbars 70. Each of four mounting channel slides 52, four mounting channel slides per each mounting rail, hold a bolt 51 that fits into the mounting channel 61 on the two sides of the crossbar 70. The operator places the security mounting bracket device 10 around the crossbar 70 so that the security mounting bracket device 10 straddles the crossbar 70 and the bolts 51 slide inside the counterbore hole bolt entry end 20 through the counterbore hole 14 located in each of the mounting posts 12. Using a proprietary security socket, a security nut 40, is placed onto each of the bolts 51, is fastened forming a bolted joint between the security mounting bracket device and the channel slide of to the mounting rail 60 securing the object, a rooftop tent, to the crossbar 70.

Once all four security mounting brackets, two per crossbar, are fastened tightly across the crossbars 70, the tent will be secured to the vehicle. The tent is safe from theft because the mounts require the use of a proprietary security socket in order to remove the tent and the security mounting bracket device mounting posts 12 are long enough to cover the bolts 51 completely so that bolt cutters cannot be used to cut the bolts and remove the tent. The counterbore hole well 14 is deep so that the security nuts 40 cannot be pried off with pliers. The security mounting bracket device 10 conforms to the shape of the crossbars 70 so that the mounts are more durable and do not bend.

The above example secures a tent with two security mounting bracket device per crossbar. The mounted object may be also secured to a crossbar using one or more security mounting bracket devices per crossbar and the number of security mounting bracket device may be selected by the user and increased in number to accommodate various dimensions of the mounted object.

Since modifications will be apparent to those of skill in the art, it is intended that this invention be limited only by the scope of the appended claims.

What is claimed is:

1. A security mounting bracket device for mounting an object to a crossbar, the security mounting bracket device comprising:
   a) a single piece of molded material having one or more bridge portions wherein each bridge portion is positioned between two mounting posts wherein each mounting post has a top portion connected to the bridge portion and a bottom portion;
   b) a counterbore hole within each of the two mounting posts, spanning the height of the post, wherein a first portion of the counterbore hole comprises a counterbore hole well positioned in the top portion of the mounting post connected to the bridge portion and wherein the counterbore hole well is circular and dimensioned for placement of a nut within the counterbore hole well, and a second coaxial portion of the counterbore hole comprises a counterbore hole bolt entry end positioned in the bottom portion of the mounting post;
   wherein the bridge portion and the two mounting posts form a contoured tunnel matching the contour and dimensions of the crossbar; and
   wherein a bolt, extending from the object to be mounted, is received in the counterbore hole bolt entry end to engage with the nut within the counterbore hole well to form a bolted joint between the security mounting bracket device and a mounted object.

2. The security mounting bracket device of claim 1, wherein the material is not altered by ambient heat or pressure exerted by the cross bar and mounted object.

3. The security mounting bracket device of claim 2, wherein the material comprises a metal, a metal alloy, a composite material, or a polymer.

4. The security mounting bracket device of claim 3, wherein the material is selected from among aluminum, steel, titanium, zinc alloys and plastic.

5. The security mounting bracket device of claim 1, wherein the width of the security mounting bracket device is proportioned such that the security mounting bracket device straddles the crossbar and the crossbar forms a contoured fit with the tunnel portion of the mounting bracket device, wherein the width (3w) of the security mounting bracket device is measured from the outer portion of the mounting posts, and is from 0.5 inches to 12.0 inches, 1.0 inches to 24.0 inches, or 1.0 foot to 5.0 feet.

6. The security mounting bracket device of claim 1, wherein the height of the security mounting bracket device mounting post is proportioned such that the height of the crossbar corresponds to the peak height of the tunnel and is from 0.2 inches to 2.0 inches, 2.0 inches to 12.0 inches, or 1.0 foot to 5.0 feet.

7. The security mounting bracket device of claim 1, wherein the counterbore hole well has a depth between 0.1 inches and 2.0 inches, or 2.0 inches and 12.0 inches, or 12.0 inches and 24.0 inches.

8. The security mounting bracket device of claim 1, wherein the counterbore hole well has a depth between 0.1 inches and 1.0 inches, or 0.3 inches and 0.9 inches, or 0.4 inches and 0.8 inches.

9. The security mounting bracket device of claim 1, wherein the device comprises two bridge portions and three post portions, and wherein the two bridge portions are connected to a shared central post that optionally includes a counterbore hole.

10. The security mounting bracket device of claim 1, wherein opposing walls of the contoured tunnel, formed by the bridge portion and the mounting posts, are oriented perpendicularly relative to the width of the security mounting bracket, and wherein the security mounting bracket device is oriented perpendicularly to a crossbar fitted within the tunnel portion of the security mounting bracket device.

11. The security mounting bracket device of claim 1, wherein opposing walls of the contoured tunnel formed by the bridge portion and the mounting posts are parallel and not oriented perpendicularly relative to the width of the security mounting bracket, and wherein a mounted security mounting bracket device is not oriented perpendicularly to the a crossbar fitted with the tunnel portion of the security mounting bracket device.

12. The security mounting bracket device of claim 11, wherein the opposing walls of the contoured tunnel formed by the bridge portion and the mounting posts are parallel and form an angle that is less than 90° relative to the width of the security mounting bracket device.

13. A method of forming a bolted joint between a mounting channel slide of a mounted object fitted with a mounting rail and the security mounting bracket device of claim 1 comprising:
   a) placing a bolt through a hole of the mounting channel slide and inserting the mounting channel slide into a channel of the mounting rail wherein the head of the bolt is positioned between the mounting channel slide and the mounting rail leaving an unthreaded and a threaded shank of the bolt exposed beneath the mounting channel slide;
   b) repeating step a) with a second bolt and a second mounting channel slide, aligning two bolts suspended from the mounting rail a distance equal to the distance between two counterbore hole bolt entry ends of the security mounting bracket device;
   c) inserting the two bolts through the aligned counterbore hole bolt entry ends of the two posts of the security mounting bracket device and positioning the threaded shank of the bolt within the well of the counterbore hole;
   d) placing a nut onto the threaded shank of the bolt within the counterbore hole well and tightening the nut onto the bolt using a socket, forming a bolted joint between the security mounting bracket device and the mounting channel slide within a mounting rail.

14. The method of claim 13 wherein the nut is selected from among a security nut and a nylon-insert lock nut.

15. A method of mounting an object fitted with a mounting rail to a crossbar using the security mounting bracket device of claim 1 comprising:
   a) placing a bolt through a hole of a mounting channel slide and inserting the mounting channel slide into a channel of the mounting rail attached to an object to be mounted wherein the head of the bolt is positioned between the mounting channel slide and the mounting rail leaving an unthreaded and a threaded shank of the bolt exposed beneath the mounting channel slide;
   b) repeating step a) with a second bolt and aligning the two bolts suspended from the mounting rail a distance equal to the distance between two counterbore hole bolt entry ends of the security mounting bracket device;
   c) placing the object with mounting rail on top of the crossbar;
   d) straddling the crossbar, perpendicular to and below the mounting channel rail, with the security mounting bracket device, inserting the two bolts suspended from the mounting rail through the counterbore hole bolt entry ends of the two posts of the security mounting bracket device and positioning the threaded shank of the bolt within the well of the counterbore hole;
   e) using a nut and a socket, placing the nut onto the threaded shank of the bolt within the counterbore hole well and tightening the nut onto the bolt using the socket, forming a bolted joint between the security mounting bracket device and the mounting channel rail wherein the security mounting bracket device and mounting channel slide secure the object to the crossbar.

16. The method of claim 15 wherein steps a)-d) are optionally repeated with a one or more sets of bolts, nuts and security mounting bracket devices forming two or more bolted joints between each security mounting bracket device and two mounting channel slides to secure the object to the crossbar with one or more security mounting bracket devices.

17. The method of claim 15 wherein the nut is selected from among a security nut and a nylon-insert lock nut.

18. A method of mounting an object fitted with two mounting rails to two crossbars comprising:
   using the security mounting bracket device of claim 1 comprising:
      a) placing a bolt through a hole of a mounting channel slide and inserting the mounting channel slide into a channel of a first mounting rail wherein a head of the bolt is positioned between the mounting channel slide and the first mounting rail leaving an unthreaded and a threaded shank of the bolt exposed beneath the mounting channel slide;
      b) repeating step a) with a second bolt and aligning the two bolts suspended from the mounting rail a distance equal to the distance between two counterbore hole bolt entry ends of the security mounting bracket device;
      c) repeating steps a) and b) on a second mounting rail;
      d) placing the object with mounting rails on top of a crossbar;
      e) straddling the crossbar, perpendicular to and below the first mounting rail, with the security mounting bracket device, inserting two bolts through the counterbore hole bolt entry ends of the two posts of the security mounting bracket device and positioning the threaded shank of the bolt within the well of the counterbore hole;
      f) using a nut and socket, placing the nut onto the threaded shank of the bolt within the counterbore hole well and tightening the nut onto the bolt and forming a bolted joint between the security mounting bracket device and the first mounting rail, wherein a bolted joint is formed between each of two security mounting bracket devices and mounting channel slide;

g) repeating steps e)-f) with a second mounting rail, using a second security mounting bracket device, and a second set of bolts, nuts, and mounting channel slides;

h) optionally repeating steps a)-g) with one or more security mounting bracket device, bolts, nuts, and mounting channel slides to secure two or more security mounting bracket devices to each mounting rail; and wherein a bolted joint is formed between each of the security mounting bracket devices and mounting channel slide.

19. The method of claim 18 wherein the nut is selected from among a security nut and a nylon-insert lock nut.

20. The method of claim 18 wherein the mounted object is selected from among a vehicle top tent, a bike rack, and a cargo box.

* * * * *